United States Patent [19]

Gollan

[11] Patent Number: 5,525,144
[45] Date of Patent: Jun. 11, 1996

[54] TANGENTIAL FLOW FILTERING AND SEPARATING

[75] Inventor: Arye Z. Gollan, Newton, Mass.

[73] Assignee: A/G Technology Corporation, Needham, Mass.

[21] Appl. No.: 425,863

[22] Filed: Apr. 20, 1995

[51] Int. Cl.⁶ ............................ B01D 53/22; B01D 69/08
[52] U.S. Cl. .................. 96/8; 96/10; 210/321.81; 210/321.9
[58] Field of Search .................. 96/4, 7–10; 210/321.79, 210/321.8, 321.81, 321.88, 321.89, 321.9

[56] References Cited

U.S. PATENT DOCUMENTS

| Re. 33,502 | 12/1990 | Gollan | 95/45 |
|---|---|---|---|
| 3,019,853 | 2/1962 | Kohman et al. | 96/10 X |
| 3,616,929 | 11/1971 | Manjikian | 210/321.9 |
| 4,220,535 | 9/1980 | Leonard | 96/8 X |
| 4,649,991 | 3/1987 | Neuhaus et al. | 210/321.81 X |
| 4,929,259 | 5/1990 | Caskey et al. | 210/321.81 X |
| 4,961,760 | 10/1990 | Caskey et al. | 96/8 X |
| 5,013,437 | 5/1991 | Trimmer et al. | 96/8 X |
| 5,108,464 | 4/1992 | Friesen et al. | 96/8 X |
| 5,158,581 | 10/1992 | Coplan | 96/8 X |
| 5,282,964 | 2/1994 | Young et al. | 96/8 X |
| 5,352,361 | 10/1994 | Prasad et al. | 210/321.81 |

FOREIGN PATENT DOCUMENTS

| 1445549 | 6/1966 | France | 210/321.81 |
|---|---|---|---|
| 53-051183 | 5/1978 | Japan | 96/8 |
| 1-281126 | 11/1989 | Japan | 96/8 |
| 2-059016 | 2/1990 | Japan | 96/8 |
| 2-135117 | 5/1990 | Japan | 96/8 |
| 3-086219 | 4/1991 | Japan | 96/10 |

*Primary Examiner*—Robert Spitzer
*Attorney, Agent, or Firm*—Fish & Richardson

[57] ABSTRACT

A membrane cartridge has a feed inlet at one end and a retentate outlet at the other. Membrane structure of geometry defines a feed flow path and a permeate flow path between the feed inlet and retentate outlet. The cartridge has flow restrictions along the permeate flow path.

11 Claims, 3 Drawing Sheets

TANGENTIAL FLOW FILTERING AND SEPARATING

The present invention relates in general to tangential flow filtering and separating and more particularly concerns novel apparatus and technique for improving the control of transmembrane pressure and countercurrent flow in a cartridge filter for ultrafiltration, microfiltration or gas separating.

For background, reference is made to U.S. Pat. Re. No. 33,502 of Arye Z. Gollan entitled GAS SEPARATING reissued Dec. 25, 1990. That patent discloses feedgas directed tangentially along the non-skin surface of gas separation membrane modules comprising a cylindrical bundle of parallel contiguous hollow fibers supported to allow feedgas to flow from an inlet at one end of a cylindrical housing through the bores of the bundled fibers to an outlet at the other end while a component of the feedgas permeates through the fibers, each having the skin side on the outside, through a permeate outlet in the cylindrical casing.

A major problem in tangential flow filtration, whether ultrafiltration or microfiltration, is the varying differential pressure along the feed-side of the membrane cartridge. As higher feed-side velocities are utilized to combat fouling and concentration polarization, the feed-side pressure differential increases. This feed-side pressure differential results in exposure of the membrane to a varying transmembrane pressure. At the inlet section, the transmembrane pressure is very high while at the retentate or outlet end of the cartridge, the transmembrane pressure is low. The transmembrane pressure progressively decreases along the length of the cartridge from the inlet to the retentate end of the cartridge.

One approach for controlling transmembrane pressure is to use a valve or a pump to control permeate flux in order to reduce the transmembrane pressure, especially at the cartridge inlet. This approach usually results in the so-called "Starling Flow Phenomenon" wherein the pressure on the permeate-side of the fiber is higher than the pressure within the fiber. This phenomenon results in backflow of permeate into the retentate, reducing cartridge productivity.

One approach for reducing variation in transmembrane pressure is to circulate a portion of the permeate stream co-current to the feed stream. Depending on cartridge design (e.g., packing density of hollow fibers), the pressure drop when flowing on the permeate side of the membrane element could be much lower than on the feed side, especially during a concentration process where the feed stream is highly viscous. Therefore, very high permeate recirculation flow rates would be required to balance the transmembrane pressure along the length of the cartridge. Artificially increasing the pressure drop on the permeate-side may compensate for this intrinsic low pressure drop reducing the permeate recirculation flow rate.

One approach for artificially increasing this pressure drop with tubular or hollow fiber cartridges is to pack the shell-side of the module with an inert material, such as glass balls or sand. This approach involves a post assembly operation that may result in a bulky cartridge. Alternatively, with hollow fiber devices, the membrane material can be packaged tightly enough within the housing to create sufficient pressure drop. This packaging may be with or without mesh spacing material which would improve the cartridge-to-cartridge reproducability of the permeate-side pressure drop by reducing the possibility for bypass around any fibers.

While this technique of packaging the fibers within the cartridge housing enhances maintenance of constant transmembrane pressure along the entire length of the cartridge, it is more suitable for feed streams having water-like viscosity and which do not exhibit a significant increase in viscosity as the concentration proceeds. Typically, with water-like feed streams, the viscosity of the permeate and the viscosity of the feed stream are similar at the beginning of the concentration process. Much higher viscosity feed solutions require quite large permeate flow rates to match the pressure drop on the feed side. As the filtration process proceeds, the need to increase the circulation of the permeate to further increase the permeate side pressure drop could become prohibitive.

According to the invention, a series of flow restrictions, typically embedded in the intercartridge potting material create obstacles to permeate flow to provide a pressure drop along the permeate side of the cartridge which is greater than the pressure drop that could be obtained with no flow restrictions to control the pressure drop along the permeate side of a hollow fiber or tubular membrane cartridge and thereby reduce variations in transmembrane pressure.

Alternatively, potting a perforated central tube inside the cartridge may be used to control the permeate side pressure drop. In this case the cartridge would be constructed and arranged so that the permeate flows into the tube through the perforations and is channeled to the ends of the cartridge. The pressure drop along the perforated tube may be controlled by inserting solid rods of varying diameter into the central tube. As the outside diameter of the inserted solid rod approaches the inside diameter of the perforated tube, the higher the pressure drop that can be obtained with minimal permeate recycle pumping. The flow restriction according to the invention reduces the pumping requirements on the permeate side when a high pressure drop on the feed side should be matched by a correspondingly high pressure drop on the permeate side. The invention thus significantly reduces variations in transmembrane pressure along the entire length of the cartridge to approach constancy with relatively low permeate circulation or even without a need for a permeate circulation pump.

Numerous other features, objects and advantages will become apparent from the following detailed description when read in connection with the accompanying drawing in which.

Figure 1:
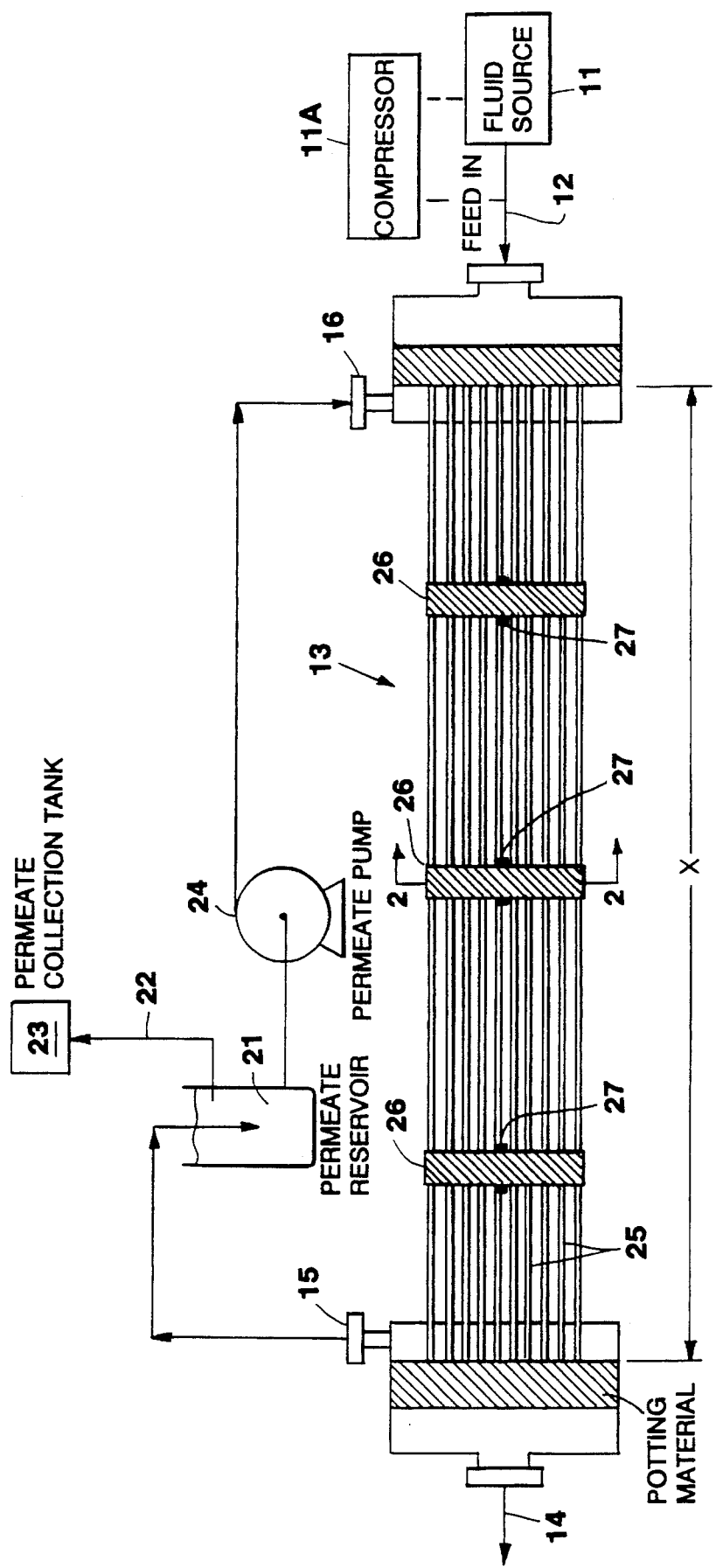
FIG. 1 is a pictorial representation of a filtration system embodying the invention.

With reference now to the drawings and more particularly FIG. 1 thereof, there is shown a pictorial representation of a system according to the invention. A fluid source 11 provides a fluid, such as a cell lysate stream from fermentation bioprocessing, through compressor 11A to the feed in input 12 at pressure $F_{p1}$ of filtration cartridge 13 to provide retentate at the feed out 14 of cartridge 13 at pressure $F_{p2}$. Cartridge 13 has a permeate recycle outlet 15 at pressure $P_{p2}$ and a permeate recycle inlet 16 at pressure $P_{p1}$. Permeate for recycling flows into permeate reservoir 21 having an overflow 22 that goes to permeate collection tank 23. Permeate pump 24 accepts permeate for recycling from permeate reservoir 21 and delivers it to permeate recycle inlet 16.

Cartridge 13 typically comprises hollow fibers, tubules or tubular membranes, such as 25, supported in potting material, such as 26, formed with orifices, such as 27. To reduce the pressure drop through a given orifice, several orifices in series can be used to reduce the pressure drop that each potting section represents. Flow from input 12 to feed out 14 occurs through the inside of hollow fibers 25.

Figure 2:
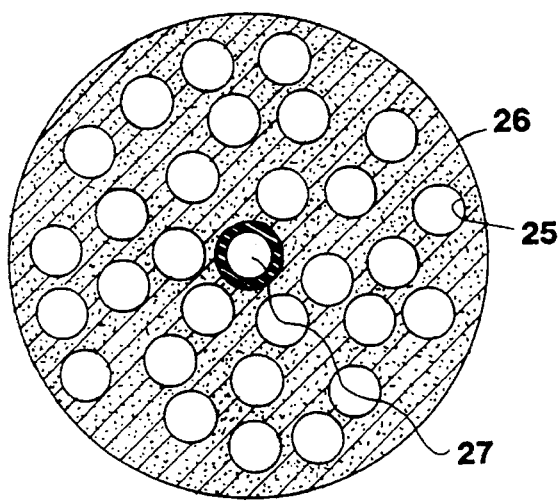
FIG. 2 is a view through section 2—2 of FIG. 1.

Referring to FIG. 2, there is shown a view through section 2—2 of FIG. 1, illustrating how potting material 26 surrounds hollow fibers, tubules or tubular membranes and is formed with central orifice 27 according to the invention.

Figure 3:
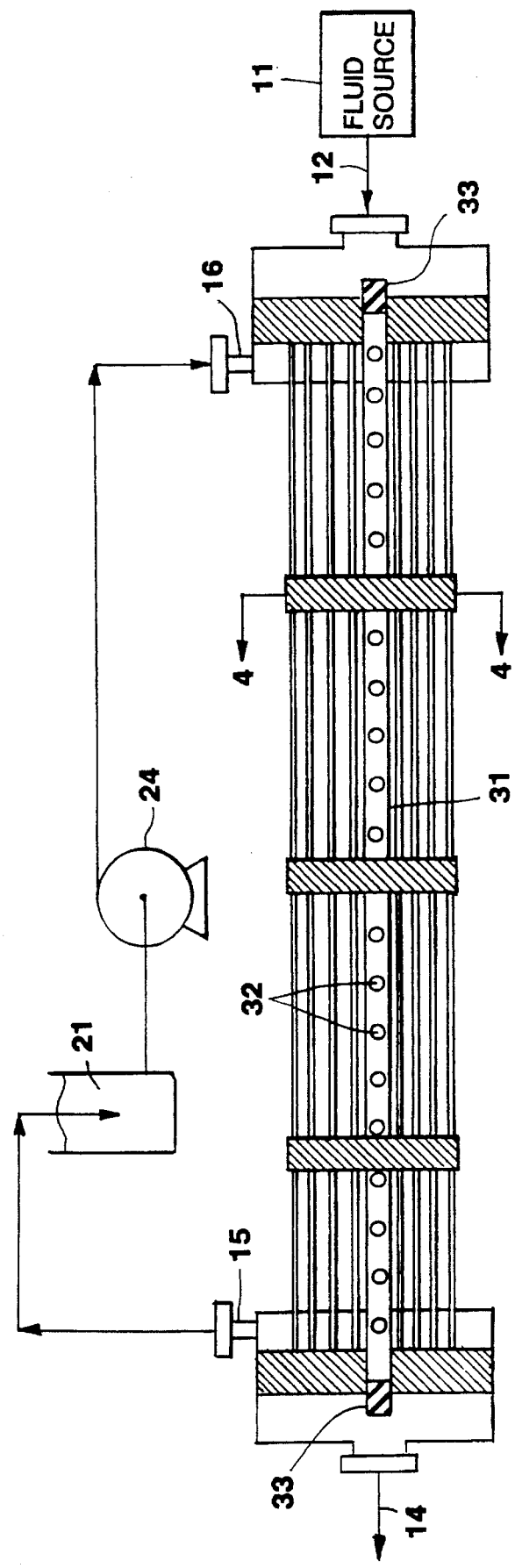
FIG. 3 is a pictorial representation of a filtration system embodying an alternate embodiment of the invention.

Referring to FIG. 3, there is shown a pictorial representation of a system embodying an alternate embodiment of the invention. The same reference symbols identify corresponding elements throughout the drawings. This system is substantially the same as the system of FIG. 1; however, instead of orifices 27, there is a perforated central tube 31 for permeate withdrawal surrounding a solid rod 32 that creates higher pressure drop with minimal permeate flow that extends along the length of the cartridge and is plugged at both ends with plugs, such as 33.

Figure 4:
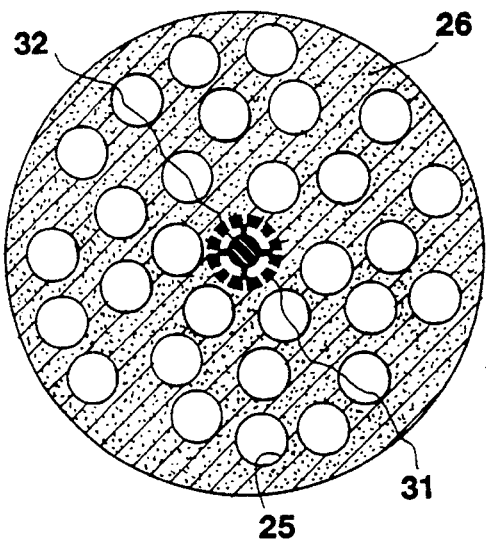
FIG. 4 is a view through section 4—4 of FIG. 3.

Referring to FIG. 4, there is shown a sectional view through section 4—4 of FIG. 3 illustrating the cross section of the potting material and perforated central tube 31 surrounding solid rod 32.

Figure 5:
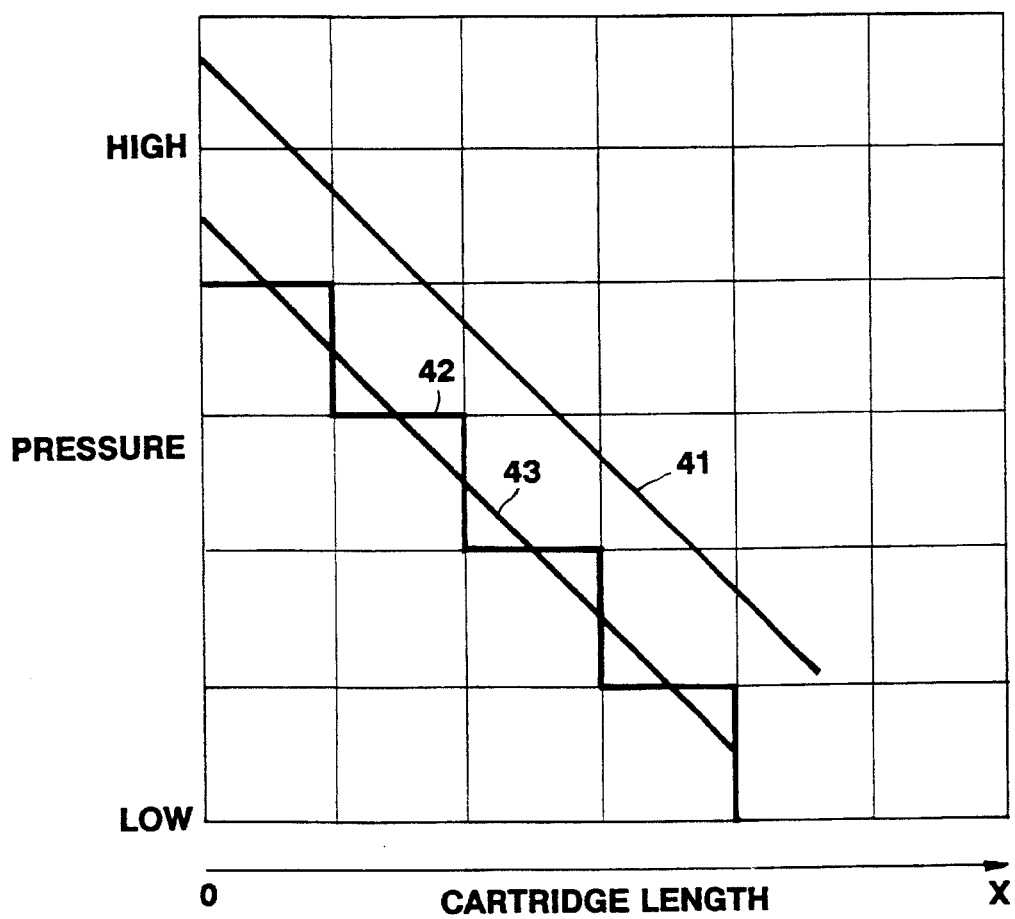
FIG. 5 is a graphical representation of pressure as a function of cartridge length comparing feed-side pressure with permeate-side pressure with the invention.

Referring to FIG. 5, there is shown a graphical representation of pressure as a function of cartridge length illustrating the effect of subcompartmentalized sections with orifices 27 on approaching the idealized constant transmembrane pressure. Curve 41 shows the feed-side pressure as a function of cartridge length x, curve 42 shows the step-wise change in permeate-side pressure and curve 43 shows the idealized permeate-side pressure that is essentially the average of the step-wise pressure curve 42 to approximate a substantially constant transmembrane pressure.

The invention has a number of advantages. By reducing the permeate-side flow requirement, the filtration system is more economical and freer of complexity. The use of restrictions to control the pressure drop avoids cartridge-to-cartridge variations that may occur if only membrane packaging or inert fillers are used to develop the pressure drop. If the desired product is a shear-sensitive protein which is passed into the permeate, it will be subjected to less pumping and therefore reduced chance of degradation. Still further, this cartridge fabrication technique is especially advantageous for gas separation. The staged, counter current flow avoids channeling on the permeate side. The step-wise compartmentalization thus approaches true counter current flow which significantly enhances separation efficiency for the membrane module.

The cartridge according to the invention may also be used for enhanced gas separation. This use does not require a pump, and there is no recirculation of the gas. A compressor, such as 11A, pressurizes the gas, and gas passes once through the module. The compartments on the shell side then function to better provide countercurrent flow, therefore avoiding channelling.

Other embodiments are within the claims.

What is claimed is:

1. A membrane cartridge, comprising, a feed inlet at one end of said cartridge, a retentate outlet at the other end of said cartridge, membrane structure characterized by transmembrane pressure that is a function of the distance between said feed inlet and said retentate outlet and of geometry defining a feed flow path and a permeate flow path between said feed inlet and said retentate outlet, said transmembrane pressure being the differences between the pressure in said feed flow path and said permeate flow path at corresponding points between said feed inlet and said retentate outlet, said cartridge constructed and arranged with flow restrictions along said permeate flow path, said flow restrictions constructed and arranged for increasing the pressure in said permeate flow path as a function of the distance from said feed inlet to said retentate outlet to reduce the variation of said transmembrane pressure as a function of length along the length of said cartridge so that the said transmembrane pressure is more nearly uniform along the length of said cartridge than said transmembrane pressure would be in the absence of said restrictions.

2. A membrane cartridge in accordance with claim 1 wherein said membrane comprises a bundle of hollow fibers, tubules or tubular membranes.

3. A membrane cartridge in accordance with claim 2 and further comprising potting material supporting said hollow fibers, tubules or tubular membranes at spaced locations along the length of said cartridge and carrying said restrictions.

4. A membrane cartridge in accordance with claim 3 wherein said restrictions comprise orifices formed in said potting material.

5. A membrane cartridge in accordance with claim 3 wherein said restrictions comprise a perforated tube extending along the length of said cartridge, and a solid rod inside said perforated tube.

6. A membrane cartridge in accordance with claim 1 and further comprising, a permeate recycle outlet near the end of said cartridge having said retentate outlet and a permeate recycle inlet near the end of said cartridge having said feed inlet.

7. A filtration cartridge in accordance with claim 6 and further comprising, a recycling channel intercoupling said permeate recycle outlet and said permeate recycle inlet.

8. Apparatus in accordance with claim 7 wherein said permeate recycling channel comprises a permeate reservoir having an inlet coupled to said permeate recycle outlet and a permeate reservoir outlet, a permeate pump having an inlet coupled to said permeate reservoir outlet and an outlet coupled to said permeate recycle inlet.

9. Apparatus in accordance with claim 8 and further comprising a permeate collection tank coupled to said permeate reservoir for receiving overflow from said permeate reservoir.

10. A membrane cartridge in accordance with claim 1 wherein said cartridge is characterized by countercurrent flow and said restrictions are constructed and arranged to improve said countercurrent flow and avoid channelling.

11. A membrane cartridge in accordance with claim 10 and further comprising a compressor coupled to said inlet for providing pressurized gas to said inlet.

* * * * *